(12) United States Patent
Fang et al.

(10) Patent No.: US 9,088,204 B2
(45) Date of Patent: Jul. 21, 2015

(54) SWITCHING REGULATOR CONTROL CIRCUIT WITH MULTIPLE CLOCK FREQUENCY SETTING MODES

(71) Applicant: Richtek Technology Corporation, Hsinchu County (TW)

(72) Inventors: Li-Wen Fang, Taipei (TW); Ping-Ching Huang, Taipei (TW); Cheng-Kuang Lin, Nantou County (TW); An-Tung Chen, Taoyuan County (TW)

(73) Assignee: Richtek Technology Corporation, Zhubei (TW)

( * ) Notice: Subject to any disclaimer, the term of this patent is extended or adjusted under 35 U.S.C. 154(b) by 115 days.

(21) Appl. No.: 13/913,050

(22) Filed: Jun. 7, 2013

(65) Prior Publication Data

US 2013/0342183 A1 Dec. 26, 2013

(30) Foreign Application Priority Data

Jun. 25, 2012 (TW) .............................. 101122580 A

(51) Int. Cl.
*G05F 1/00* (2006.01)
*H02M 3/04* (2006.01)
*H02M 1/08* (2006.01)

(52) U.S. Cl.
CPC . *H02M 3/04* (2013.01); *H02M 1/08* (2013.01)

(58) Field of Classification Search
CPC ................................ H02M 3/156; H02M 3/04
USPC .................................................. 323/282, 323
See application file for complete search history.

(56) References Cited

PUBLICATIONS

Texas Instruments, "4.5V to 17V Input, 6A Synchronous Step Down SWIFT TM Converter", May 2011, pp. 1-44.*
Texas Instruments, "4.5V to 17V Input, 6A Synchronous Step Down SWIFT Converter With Hiccup", Mar. 2011, TPS54622 pp. 1-35.

* cited by examiner

*Primary Examiner* — Timothy J Dole
*Assistant Examiner* — Htet Kyaw
(74) *Attorney, Agent, or Firm* — Birch, Stewart, Kolasch & Birch, LLP

(57) ABSTRACT

A control circuit of a switching regulator includes a control pin for coupling with an external resistor; a resistor detecting circuit for detecting a resistance of the external resistor; a current generating module for generating a corresponding control current according to a detection result of the resistor detecting circuit; an oscillating circuit for generating a clock signal; and a mode-switching circuit. When the mode-switching circuit configures the oscillating circuit to operate in a resistor-controlled mode, the oscillating circuit generates the clock signal according to the control current so that the clock signal has a frequency corresponding to the resistance of the external resistor. When the mode-switching circuit configures the oscillating circuit to operate in a signal-controlled mode, the oscillating circuit generates the clock signal according to an external synchronous signal coupled with the control pin so that the clock signal is synchronized with the external synchronous signal.

19 Claims, 6 Drawing Sheets

US 9,088,204 B2

SWITCHING REGULATOR CONTROL CIRCUIT WITH MULTIPLE CLOCK FREQUENCY SETTING MODES

CROSS-REFERENCE TO RELATED APPLICATIONS

This application claims the benefit of priority to Patent Application No. 101122580, filed in Taiwan on Jun. 25, 2012; the entirety of which is incorporated herein by reference for all purposes.

BACKGROUND

The disclosure generally relates to a control circuit of a switching regulator and, more particularly, to a control circuit with multiple clock frequency setting modes.

A conventional control circuit of some switching regulators is equipped with a frequency setting pin and a synchronous signal pin. The frequency setting pin is utilized to couple with an external resistor for determining the frequency of an internal clock signal of the control circuit. The synchronous signal pin is utilized for receiving an external synchronous signal so that the control circuit configures the internal clock frequency to be synchronized with the external synchronous signal.

The above two pins provides a higher selection flexibility in setting the frequency of the clock signal of the control circuit, but require to occupy more chip packaging areas. Apparently, the pin count of the control circuit should be reduced if it is required to further reduce the chip packaging area of the control circuit.

SUMMARY

In view of the foregoing, it may be appreciated that a substantial need exists for apparatuses that can reduce the pin count of a control circuit of a switching regulator while not adversely affecting the selection flexibility in setting the frequency of the clock signal inside the control circuit.

An example embodiment of a control circuit of a switching regulator is disclosed, comprising: a control pin for coupling with an external resistor; a resistor detecting circuit, coupled with the control pin, configured to operably detect a resistance of the external resistor when the control pin is coupled with the external resistor; a current generating module, coupled with the resistor detecting circuit, configured to operably generate a corresponding control current according to a detection result of the resistor detecting circuit; an oscillating circuit, coupled with the control pin and the current generating module, configured to operably generate a clock signal; and a mode-switching circuit, coupled with the control pin and the oscillating circuit; wherein when the mode-switching circuit configures the oscillating circuit to operate in a resistor-controlled mode, the oscillating circuit generates the clock signal according to the control current so that the clock signal has a frequency corresponding to the resistance of the external resistor, and when the mode-switching circuit configures the oscillating circuit to operate in a signal-controlled mode, the oscillating circuit generates the clock signal according to an external synchronous signal coupled with the control pin so that the clock signal is synchronized with the external synchronous signal.

It is to be understood that both the foregoing general description and the following detailed description are example and explanatory only and are not restrictive of the invention, as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Figure 1:
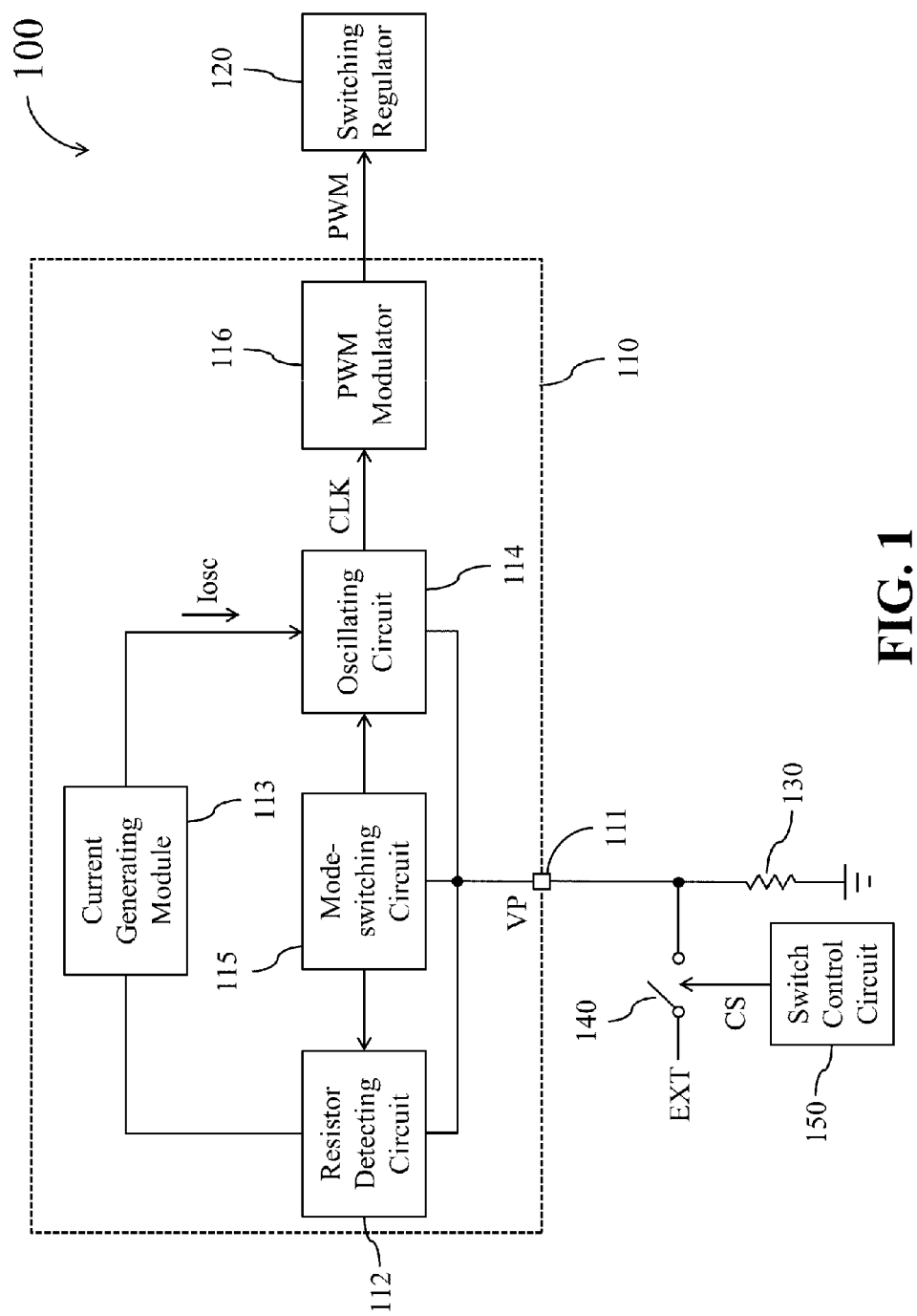
FIG. 1 shows a simplified functional block diagram of a power converter according to one embodiment of the present disclosure.

FIG. 1 shows a simplified functional block diagram of a power converter 100 according to one embodiment of the present disclosure. The power converter 100 comprises a control circuit 110, a switching regulator 120, a resistor 130, a switch 140, and a switch control circuit 150. The control circuit 110 is coupled with the switching regulator 120 and configured to operably control the switching regulator 120 to perform a voltage regulating operation on an input voltage to provide required operating voltage for the circuits in the subsequent stages. The resistor 130 and the switch 140 are coupled with the control circuit 110. The switch control circuit 150 is coupled with the switch 140 and configured to operably control the operations of the switch 140. In operations, the power converter 100 may utilize the switch control circuit 150 to decide whether to couple an external synchronous signal EXT with the control circuit 110 to change the way the control circuit 110 generating a clock signal CLK. When the switch control circuit 150 turns off the switch 140, the frequency of the clock signal CLK generated by the control circuit 110 is determined by the resistance of the external resistor 130. When the switch control circuit 150 turns on the switch 140 to couple the external synchronous signal EXT with the control circuit 110, the control circuit 110 synchronizes the clock signal CLK with the external synchronous signal EXT.

In this embodiment, the control circuit 110 comprises a control pin 111, a resistor detecting circuit 112, a current generating module 113, an oscillating circuit 114, a mode-switching circuit 115, and a PWM modulator 116. The control pin 111 is utilized for coupling with the external resistor 130 and the external switch 140. The resistor detecting circuit 112 is coupled with the control pin 111 and configured to operably detect the resistance of the resistor 130 when the control pin 111 is coupled with the resistor 130. The current generating module 113 is coupled with the resistor detecting circuit 112 and configured to operably generate a corresponding control current Iosc according to the detection results of the resistor detecting circuit 112. The oscillating circuit 114 is coupled with the control pin 111 and the current generating module 113, and configured to operably generate the clock signal CLK. The mode-switching circuit 115 is coupled with the control pin 111 and the oscillating circuit 114. The mode-switching circuit 115 is configured to operably switch the oscillating circuit 114 between a resistor-controlled mode and a signal-controlled mode. The PWM modulator 116 is coupled with the oscillating circuit 114 and configured to generate a PWM signal PWM according to the clock signal CLK outputted from the oscillating circuit 114 to control the switching frequency of the switching regulator 120.

When the mode-switching circuit 115 configures the oscillating circuit 114 to operate in the resistor-controlled mode, the oscillating circuit 114 generates the clock signal CLK according to the control current Iosc, so that the frequency of the clock signal CLK corresponds to the resistance of the external resistor 130. When the mode-switching circuit 115 configures the oscillating circuit 114 to operate in the signal-controlled mode, the oscillating circuit 114 generates the clock signal CLK according to the external synchronous signal EXT, so that the clock signal CLK is synchronized with the external synchronous signal EXT.

In practice, different functional blocks of the control circuit 110 may be integrated into a single circuit chip, or may be realized with different circuit chips. For example, the PWM modulator 116 of the control circuit 110 may be realized with an independent circuit chip, while the other functional blocks of the control circuit 110 may be integrated into another circuit chip.

Figure 2:
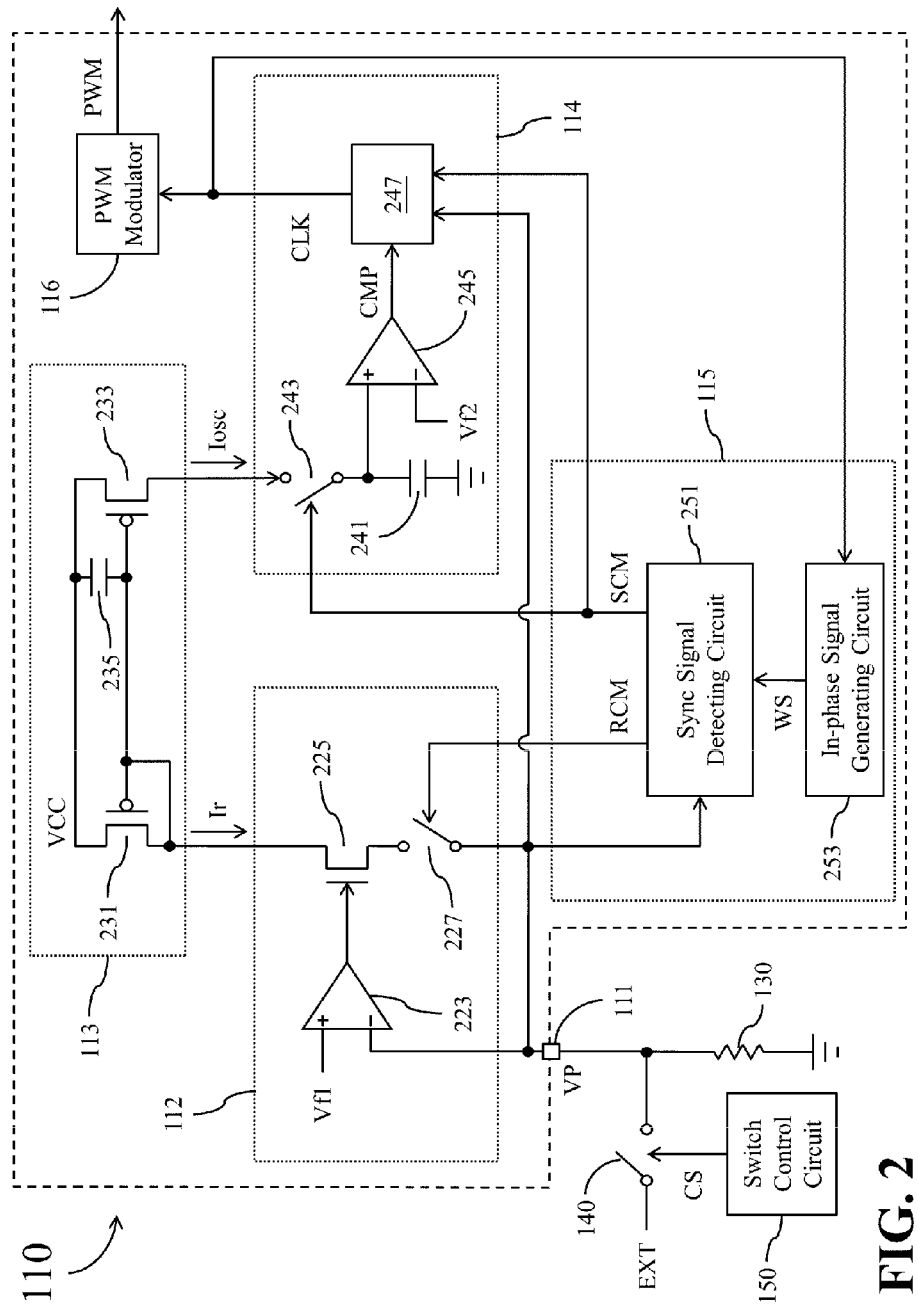
FIG. 2 shows a simplified functional block diagram of a control circuit of FIG. 1 according to one embodiment of the present disclosure.

FIG. 2 shows a simplified functional block diagram of the control circuit 110 of FIG. 1 according to one embodiment of the present disclosure. In this embodiment, the resistor detecting circuit 112 comprises a first comparison circuit 223, a transistor 225, and a first switch 227. The transistor 225 and the switch 227 are coupled between the current generating module 113 and the control pin 111. An output terminal of the comparison circuit 223 is coupled with a control terminal of the transistor 225, and an input terminal of the comparison circuit 223 is coupled with the control pin 111 and a first reference voltage Vf1. The comparison circuit 223 is configured to operably compare a voltage VP of the control pin 111 with the first reference voltage Vf1, and to operably control a sensing current Ir flowing through the transistor 225 according to the comparison result. The mode-switching circuit 115 is coupled with a control terminal of the switch 227 and configured to operably control the switching operation of the switch 227.

The oscillating circuit 114 of this embodiment comprises a first capacitor 241, a second switch 243, a second comparison circuit 245, and a combinational logic circuit 247. The switch 243 is coupled between the capacitor 241 and the current generating module 113, and a control terminal of the switch 243 is coupled with the mode-switching circuit 115. The switch 243 is configured to selectively couple the control current Iosc with the capacitor 241 under control of the mode-switching circuit 115. The comparison circuit 245 is coupled with the capacitor 241 and a second reference voltage Vf1. The comparison circuit 245 is configured to operably compare a voltage across the capacitor 241 with the second reference voltage Vf1 to generate a comparison signal CMP. The combinational logic circuit 247 is coupled with the control pin 111, the mode-switching circuit 115, the PWM modulator 116, and the comparison circuit 245. The combinational logic circuit 247 is configured to operably decide the way of generating the clock signal CLK under control of the mode-switching circuit 115.

In the embodiment of FIG. 2, the mode-switching circuit 115 comprises a sync signal detecting circuit 251 and an in-phase signal generating circuit 253. The sync signal detecting circuit 251 is coupled with the control pin 111, the resistor detecting circuit 112, and the oscillating circuit 114. The sync signal detecting circuit 251 is configured to operably detect the voltage VP of the control pin 111 and to control the operations of the resistor detecting circuit 112 and the oscillating circuit 114. The in-phase signal generating circuit 253 is coupled with the sync signal detecting circuit 251 and the oscillating circuit 114. The in-phase signal generating circuit 253 is configured to operably generate an in-phase signal WS having the same phase as the clock signal CLK according to the clock signal CLK. For example, each time the in-phase signal generating circuit 253 is triggered by the raising edge of the clock signal CLK, the in-phase signal generating circuit 253 may generate a corresponding pulse having a relatively-narrower pulse width as the in-phase signal WS.

The operations of the control circuit 110 will be further described in the following by referencing to FIG. 3 and FIG. 4.

Figure 3:
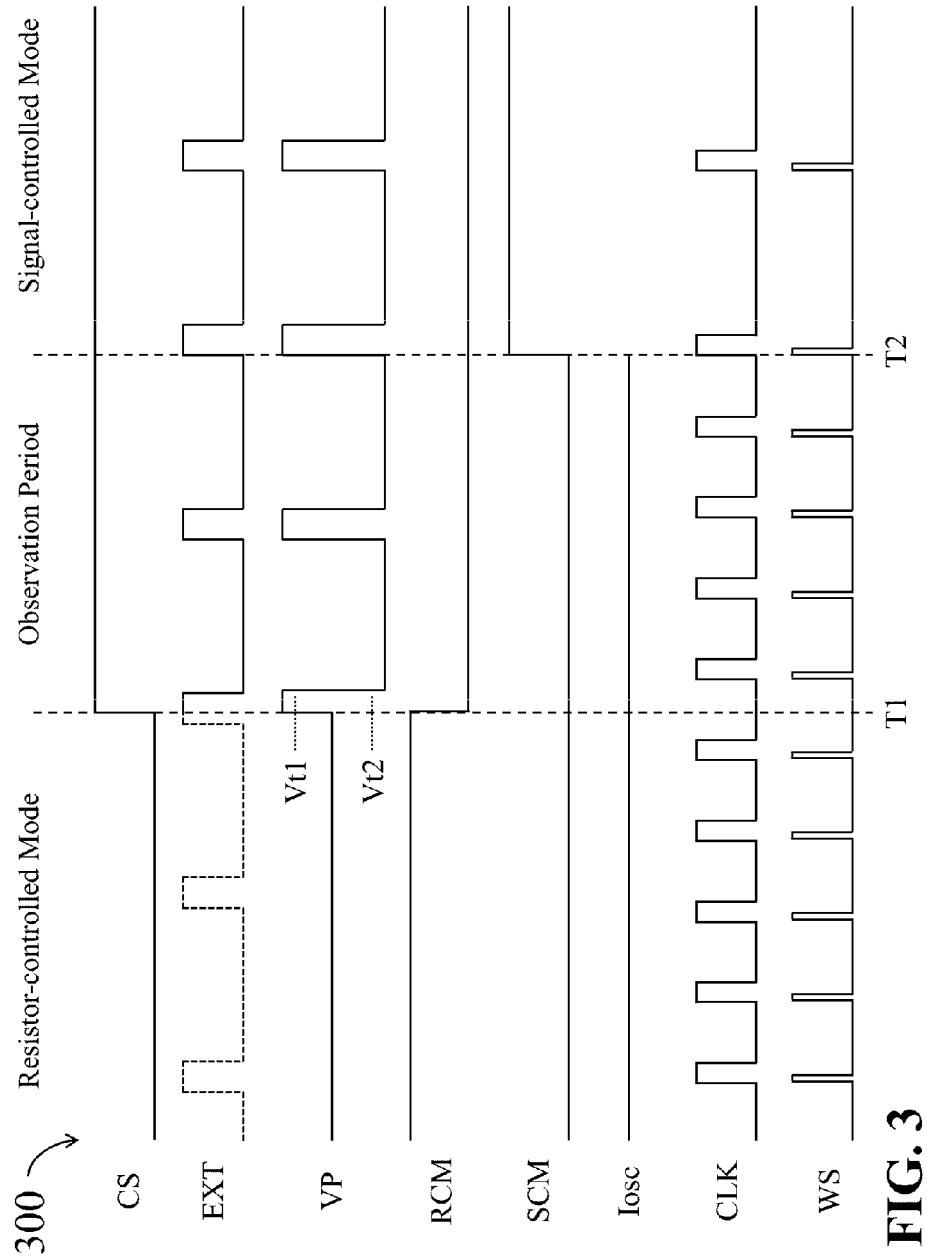
FIGS. 3-4 show simplified timing diagrams of the control circuit of FIG. 2 according to different embodiments of the present disclosure.

FIG. 3 shows a simplified timing diagram 300 of the control circuit 110 according to one embodiment of the present disclosure. As shown in FIG. 3, when the switch control circuit 150 configures a control signal CS to a low voltage level to turn off the switch 140, e.g., in the period before a time point T1, the external synchronous signal EXT is not coupled with the control pin 111. In this situation, the voltage VP of the control pin 111 is substantially equal to the first reference voltage Vf1 of the comparison circuit 223. In this stage, the sync signal detecting circuit 251 in the mode-switching circuit 115 configures the oscillating circuit 114 to operate in the resistor-controlled mode and configures a control signal RCM to a high voltage level to turn on the switch 227. In this situation, the comparison circuit 223, the transistor 225, and the switch 227 form a negative feedback loop, so that the sensing current Ir flowing through the transistor 225 would be inversely proportional to the resistance of the external resistor 130.

Accordingly, the resistor detecting circuit 112 may be utilized to detect the resistance of the external resistor 130 to decide the corresponding sensing current Ir. The current generating module 113 generates the control current Iosc having a magnitude corresponding to the sensing current Ir flowing through the transistor 225. Since the magnitude of the sensing current Ir corresponds to the resistance of the external resistor 130, the magnitude of the control current Iosc would be correspondingly to the resistance of the external resistor 130 as well.

In practice, the current generating module 113 may be realized with a current mirror of various structures to duplicate the sensing current Ir so as to generate the control current Iosc identical to or proportional to the sensing current Ir. For example, in the embodiment of FIG. 2, the current generating module 113 comprises transistors 231 and 233 and a second capacitor 235. A first terminal of the transistor 231 is coupled with a first terminal of the transistor 233, and coupled with a fixed voltage VCC. A second terminal and a control terminal of the transistor 231 are coupled with resistor detecting circuit 112. A control terminal of the transistor 233 is coupled with the control terminal of the transistor 231 to form a current mirror for duplicating the sensing current Ir flowing through the resistor detecting circuit 112 to a second terminal of the transistor 233 so as to generate the control current Iosc. A terminal of the capacitor 235 is coupled with the first terminal of the transistor 231, and another terminal of the capacitor 235 is coupled with the control terminals of the transistors 231 and 233.

When the sync signal detecting circuit 251 in the mode-switching circuit 115 configures the oscillating circuit 114 to operate in the resistor-controlled mode, the sync signal detecting circuit 251 configures a control signal SCM to a low voltage level to turn on the switch 243 of the oscillating circuit 114, so that the control current Iosc is coupled with the capacitor 241 of the oscillating circuit 114. In this situation, the sync signal detecting circuit 251 utilizes the control signal SCM to configure the combinational logic circuit 247 of the oscillating circuit 114 to generate the clock signal CLK according to the comparison signal CMP outputted from the comparison circuit 245. As a result, the frequency of the clock signal CLK corresponds to the magnitude of the control current Iosc. Since the magnitude of the control current Iosc is corresponding to the resistance of the external resistor 130, the frequency of the clock signal CLK generated by the combinational logic circuit 247 is determined by the resistance of the external resistor 130 in this moment.

In order to automatically switch the way of generating the clock signal CLK, the sync signal detecting circuit 251 in the mode-switching circuit 115 detects the variation of the voltage VP of the control pin 111. Once the voltage VP deviates from a predetermined range, such as a range of Vt1~Vt2, the sync signal detecting circuit 251 monitors the voltage VP for a period of time to determine whether the variation of the voltage VP is caused by coupling the external synchronous signal EXT with the control pin 111 or caused by noise.

In the embodiment of FIG. 3, when the switch control circuit 150 switches the control signal CS to a high voltage level at the time point T1 to couple the external synchronous signal EXT with the control pin 111 via the switch 140, the voltage VP of the control pin 111 would be influenced by the waveforms of the external synchronous signal EXT. Accordingly, the voltage VP of the control pin 111 would increase and then begin to present a periodic variation. When the sync signal detecting circuit 251 detects that the voltage VP of the control pin 111 exceeds the predetermined upper limit Vt1 at the time point T1, the sync signal detecting circuit 251 enters an observation period to monitor whether the voltage VP begins to present periodic high-low transitions.

The sync signal detecting circuit 251 may switches the control signal RCM to a low voltage level to turn off the switch 227 when entering the observation period (i.e., when detected that the voltage VP deviates from the predetermined range) to prevent the stability of the control current Iosc generated by the current generating module 113 from being affected by the variation of the voltage VP of the control pin 111 during the observation period. In this situation, the control current Iosc would be maintained unchanged through the discharging of the capacitor 235. As a result, the frequency of the clock signal CLK outputted from the oscillating circuit 114 can be maintained the same as or similar to that when the oscillating circuit 114 operates in the resistor-controlled mode.

The sync signal detecting circuit 251 may determine that the external synchronous signal EXT is coupled with the control pin 111 when detected that the voltage VP presents one or more periodic high-low transitions. For example, the sync signal detecting circuit 251 of this embodiment determines that the external synchronous signal EXT is coupled with the control pin 111 when detected that the voltage VP presents four high-low transitions. When a phase of square waves of the voltage VP and a phase of the in-phase signal WS generated by the in-phase signal generating circuit 253 are the same or have a difference smaller than a threshold, the sync signal detecting circuit 251 ends the observation period. In practice, the sync signal detecting circuit 251 may determine that the square wave of the voltage VP and the in-phase signal WS have the same phase when the raising edge of the square wave of the voltage VP is aligned with the raising edge of the in-phase signal WS. The sync signal detecting circuit 251 may determine that the phase of square waves of the voltage VP and the phase of the in-phase signal WS have a difference smaller than the threshold when the raising edge of the square wave of the voltage VP is within the range of the pulse width of the in-phase signal WS.

In the embodiment of FIG. 3, when the sync signal detecting circuit 251 detected that the raising edge of the square wave of the voltage VP is aligned with the raising edge of the in-phase signal WS at a time point T2, the sync signal detecting circuit 251 leaves the observation period. When the sync signal detecting circuit 251 leaves the observation period, the sync signal detecting circuit 251 switches the oscillating circuit 114 to the signal-controlled mode. As shown in the timing diagram 300, the sync signal detecting circuit 251 switches the control signal SCM to a high voltage level at this moment to configure the combinational logic circuit 247 of the oscillating circuit 114 to generate the clock signal CLK according to the external synchronous signal EXT, not according to the output of the comparison circuit 245. In this way, the clock signal CLK generated by the oscillating circuit 114 in the signal-controlled mode is synchronized with the external synchronous signal EXT.

When the sync signal detecting circuit 251 switches the oscillating circuit 114 to the signal-controlled mode, the sync signal detecting circuit 251 may utilize the control signal SCM to turn off the switch 243 of the oscillating circuit 114 to thereby stop coupling the control current Iosc with the capacitor 241 of the oscillating circuit 114 so as to reduce the current consumption of the oscillating circuit 114 and the control circuit 110 in the signal-controlled mode. In addition, the in-phase signal generating circuit 253 of the mode-switching circuit 115 may generate the in-phase signal WS only when the sync signal detecting circuit 251 stays in the observation period in order to further reduce the power consumption of the control circuit 110.

Figure 4:
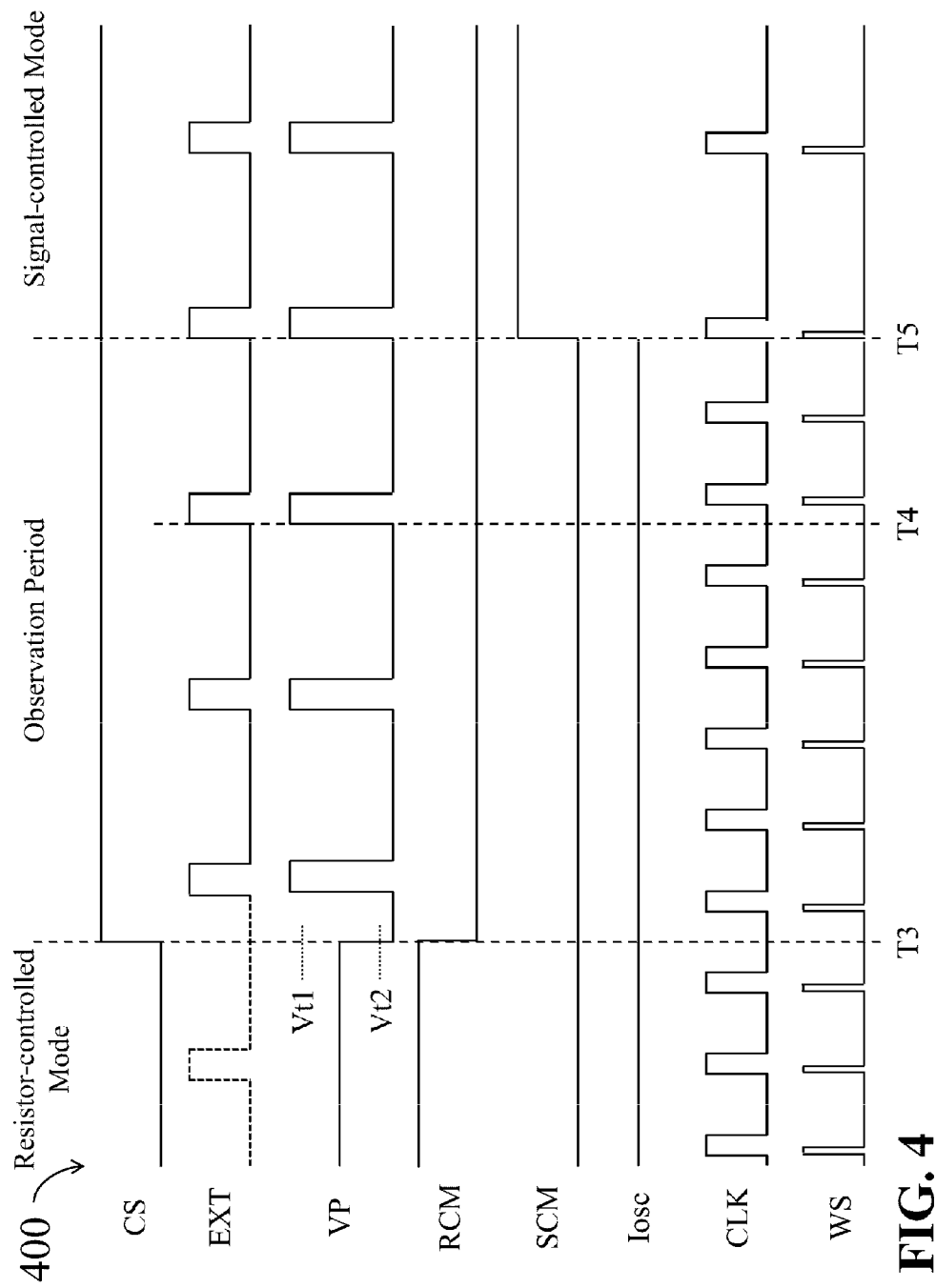

FIG. 4 shows a simplified timing diagram 400 of the control circuit 110 according to another embodiment of the present disclosure. The embodiment of FIG. 4 is similar to the embodiment of FIG. 3. The difference between the two embodiments is in that when the switch control circuit 150 switches the control signal CS to a high voltage level at a time point T3 to couple the external synchronous signal EXT with the control pin 111 via the switch 140, the voltage VP of the control pin 111 would be influenced by the waveforms of the external synchronous signal EXT, so that the voltage VP would decrease and then begin to present a periodic variation.

When the sync signal detecting circuit 251 detects that the voltage VP of the control pin 111 is lower than the predetermined lower limit Vt2 at the time point T3, the sync signal detecting circuit 251 enters an observation period to monitor whether the voltage VP begins to present periodic high-low transitions.

The sync signal detecting circuit 251 of this embodiment determines that the external synchronous signal EXT is coupled with the control pin 111 when detected that the voltage VP presents five high-low transitions at a time point T4. When a phase of square waves of the voltage VP and a phase of the in-phase signal WS generated by the in-phase signal generating circuit 253 are the same (e.g., when the raising edge of the square wave of the voltage VP is aligned with the raising edge of the in-phase signal WS) or have a difference smaller than a threshold, the sync signal detecting circuit 251 ends the observation period.

In the embodiment of FIG. 4, when the sync signal detecting circuit 251 detected that the raising edge of the square wave of the voltage VP is within the range of the pulse width of the in-phase signal WS at a time point T5, the sync signal detecting circuit 251 leaves the observation period.

The above descriptions regarding the other operations of the control circuit 110 in the previous embodiments are also applicable to the embodiment of FIG. 4. For the sake of brevity, the descriptions will not be repeated here.

In some embodiments, the in-phase signal generating circuit 253 of the mode-switching circuit 115 may be omitted. In these embodiments, after the sync signal detecting circuit 251 detected that the voltage VP of the control pin 111 deviates from the predetermined range and then enters the observation period, the sync signal detecting circuit 251 may determine that the external synchronous signal EXT is coupled with the control pin 111 when detecting that the voltage VP presents one or more periodic high-low transitions. At this time, the sync signal detecting circuit 251 may leave the observation period, and needs not to wait for that the edge of the square wave of the voltage VP is aligned with the edge of the in-phase signal WS generated from the in-phase signal generating circuit 253.

In the previous embodiment of FIG. 2, the transistor 225 of the resistor detecting circuit 112 is arranged the current path between the current generating module 113 and the control pin 111, and the switch 227 is arranged on the current path between the transistor 225 and the control pin 111. But this is merely an embodiment, rather than a restriction to the practical implementations of the resistor detecting circuit 112. In practice, the switch 227 may be instead arranged on the current path between the current generating module 113 and the transistor 225. In addition, the number of switches employed in the resistor detecting circuit 112 may be increased based on the circuit design requirement, and not limited to the number in the embodiment of FIG. 2.

The way of setting the observation period by the mode-switching circuit 115 may be adjusted according to the circuit design requirement, and not restricted to the approach adopted in the previous embodiments. For example, the mode-switching circuit 115 may set the observation period to have a fixed length of time.

Figure 5:
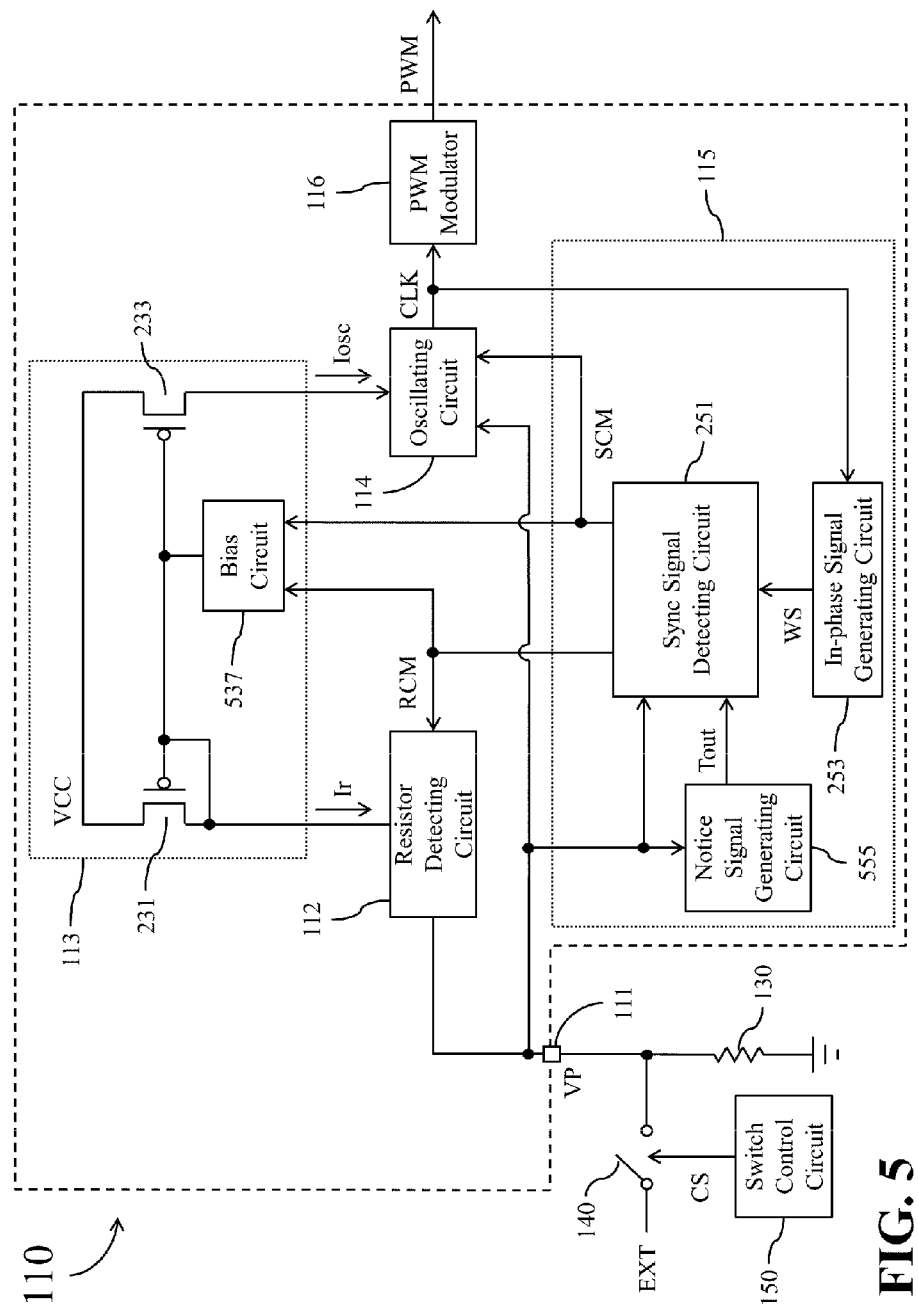
FIG. 5 shows a simplified functional block diagram of the control circuit of FIG. 1 according to another embodiment of the present disclosure.

FIG. 5 shows a simplified functional block diagram of the control circuit 110 according to another embodiment of the present disclosure. The control circuit 110 of FIG. 5 is similar to the control circuit 110 of FIG. 2. One of the differences between the two embodiments is that the current generating module 113 in FIG. 5 further comprises a bias circuit 537 but omits the capacitor 235. The bias circuit 537 is coupled with the control terminal of the transistor 233 and the mode-switching circuit 115, and configured to selectively apply a predetermined bias to the control terminal of the transistor 233 under control of the mode-switching circuit 115.

The mode-switching circuit 115 in FIG. 5 further comprises a notice signal generating circuit 555. The notice signal generating circuit 555 is coupled with the control pin 111 and the sync signal detecting circuit 251, and configured to operably detect the square wave cycle of the voltage VP of the control pin 111. When the notice signal generating circuit 555 detected that the square wave cycle of the voltage VP exceeds a predetermined length, the notice signal generating circuit 555 generates a corresponding notice signal Tout to the sync signal detecting circuit 251.

When the sync signal detecting circuit 251 in the mode-switching circuit 115 configures the oscillating circuit 114 to operate in the signal-controlled mode, the notice signal generating circuit 555 records respective time lengths for multiple square wave cycles of the voltage VP, and the sync signal detecting circuit 251 switches the control signal SCM to a high voltage level to control the bias circuit 537 to begin applying the predetermined bias to the control terminal of the transistor 233.

The operations of the control circuit 110 of FIG. 5 will be further described in the following by referencing to FIG. 5.

Figure 6:
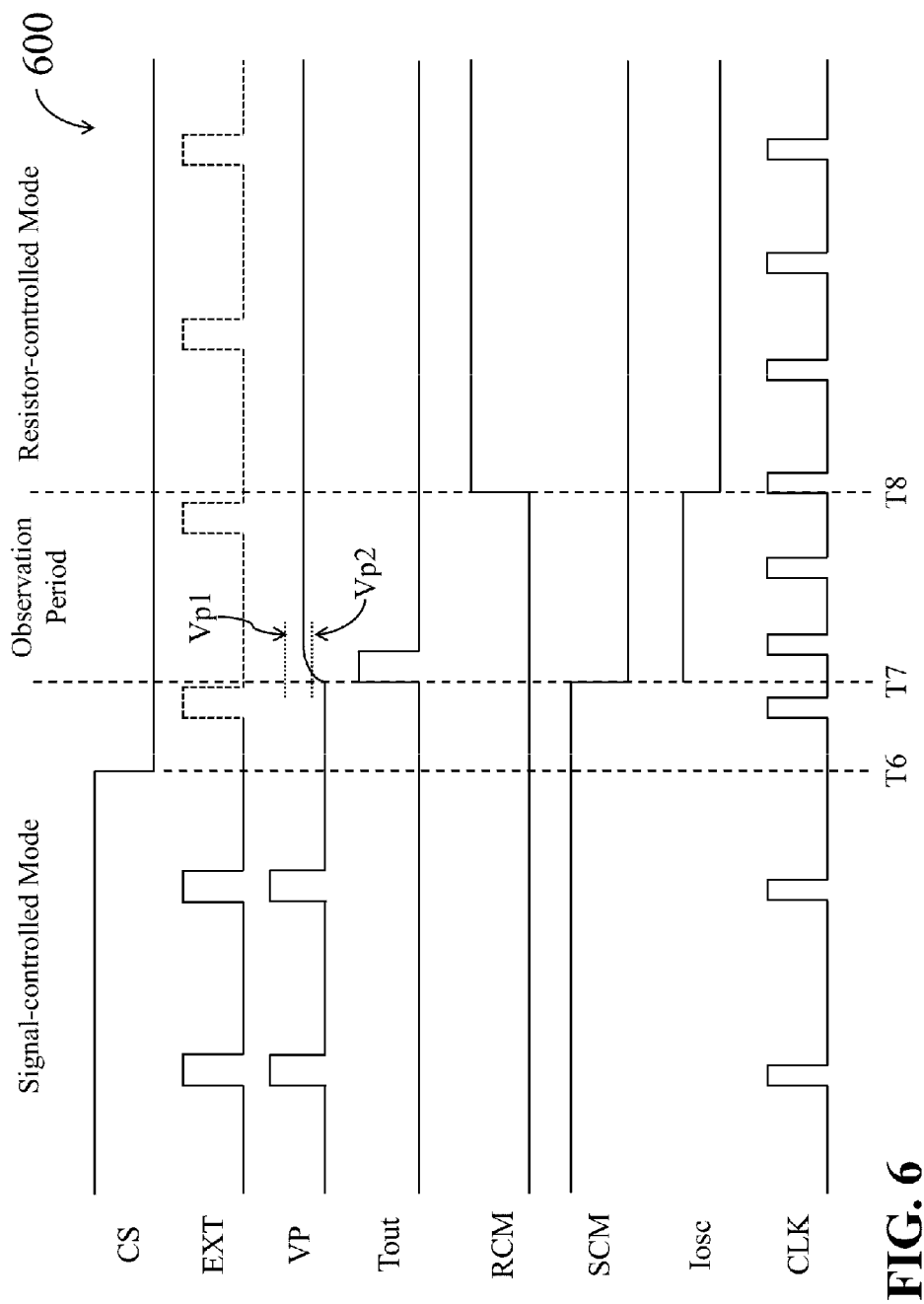
FIG. 6 shows a simplified functional block diagram of the control circuit of FIG. 5 according to another embodiment of the present disclosure

As shown in FIG. 6, after the switch control circuit 150 configures the control signal CS to a low voltage level at a time point T6 to turn off the switch 140, the external synchronous signal EXT is ceased to be coupled with the control pin 111. When the notice signal generating circuit 555 at a time point T7 detected that a length of time of a square wave of the voltage VP is longer than that of the previous square wave, the notice signal generating circuit 555 generates the notice signal Tout to notify the sync signal detecting circuit 251.

When received the notice signal Tout, the sync signal detecting circuit 251 enters the observation period and switches the control signal SCM to a low voltage level to turn on the switch 243 of the oscillating circuit 114. In addition, the sync signal detecting circuit 251 also configures the combinational logic circuit 247 of the oscillating circuit 114 to instead generate the clock signal CLK according to the comparison signal CMP outputted from the comparison circuit 245. In this situation, the control current Iosc is coupled with the capacitor 241 of the oscillating circuit 114, and the magnitude of the control current Iosc is determined by the bias that the bias circuit 537 applies to the control terminal of the transistor 233. Accordingly, the frequency of the clock signal CLK outputted from the oscillating circuit 114 is also determined by the bias that the bias circuit 537 applies to the control terminal of the transistor 233.

If the voltage VP has been failing within a predetermined voltage range for a period longer than a predetermined number of cycles of the clock signal CLK, the sync signal detecting circuit 251 may determine that the external synchronous signal EXT is ceased to be coupled with the control pin 111.

For example, in the embodiment of FIG. 6, the sync signal detecting circuit 251 determines that the external synchronous signal EXT is ceased to be coupled with the control pin 111 when detected that the voltage VP has been failing within the predetermined voltage range Vp1~Vp2 for a period longer than two cycles of the clock signal CLK, such as at a time point T8. In this situation, as shown in the timing diagram 600, the sync signal detecting circuit 251 leaves the observation period and switches the oscillating circuit 114 to the resistor-controlled mode. Meanwhile, the sync signal detecting circuit 251 switches the control signal RCM to a high voltage level to control the bias circuit 537 to stop applying the bias to the control terminal of the transistor 233. In addition, the sync signal detecting circuit 251 turns on the switch 227 of the resistor detecting circuit 112, so that the resistor detecting circuit 112 starts to detect the resistance of the external resistor 130 to decide the magnitudes of the sensing current Ir and the control current Iosc.

In the embodiment of FIG. 6, since the oscillating circuit 114 starts to operate when the sync signal detecting circuit 251 enters the observation period (i.e., at the time point T7), the oscillating circuit 114 is thus able to reach the steady state after the sync signal detecting circuit 251 leaves the observation period (i.e., at the time point T8), so that the frequency of the clock signal CLK outputted from the oscillating circuit 114 would be corresponding to the resistance of the external resistor 130.

As described previously, the sync signal detecting circuit 251 controls the bias circuit 537 to apply the bias to the control terminal of the transistor 233 when the oscillating circuit 114 operates in the signal-controlled mode, and to stop applying the bias when the oscillating circuit 114 is switched to the resistor-controlled mode. In addition, the frequency of the clock signal CLK generated during the transition of the oscillating circuit 114 from the signal-controlled mode to the resistor-controlled mode can be maintained stable by utilizing the bias circuit 537 to apply the bias to the control terminal of the transistor 233, thereby avoiding the PWM modulator 116 in the subsequent stage to conduct erroneous operation.

In the embodiment of FIG. 6, the bias applied to the control terminal of the transistor 233 by the bias circuit 537 causes the control current Iosc received by the oscillating circuit 114 when the oscillating circuit 114 is just switched to the resistor-controlled mode to be slightly higher than that when the oscillating circuit 114 reaches the steady state. In practice, the bias applied to the control terminal of the transistor 233 by the bias circuit 537 may be designed to cause the control current Iosc received by the oscillating circuit 114 when the oscillating circuit 114 is just switched to the resistor-controlled mode to be slightly lower than that when the oscillating circuit 114 reaches the steady state.

The above descriptions regarding the operations of the control circuit 110 of FIG. 2 during the transition of the oscillating circuit 114 from the resistor-controlled mode to the signal-controlled mode are also applicable to the embodiment of FIG. 5, and those descriptions will not be repeated here. In practice, in the observation period within the transition of the oscillating circuit 114 from the resistor-controlled mode to the signal-controlled mode, the sync signal detecting circuit 251 may also control the bias circuit 537 to apply a bias to the control terminal of the transistor 233 to ensure that the frequency of the clock signal CLK generated during the transition of the oscillating circuit 114 from the resistor-controlled mode to the signal-controlled mode can be maintained stable, thereby avoiding the PWM modulator 116 in the subsequent stage to conduct erroneous operation.

In the aforementioned embodiments, the notice signal generating circuit 555 issues the notice signal Tout to the sync signal detecting circuit 251 once detected that a length of time of a square wave of the voltage VP is longer than that of the previous square wave. This is merely an embodiment, rather than a restriction to the practical implementations of the notice signal generating circuit 555. For example, the notice signal generating circuit 555 may issue the notice signal Tout to the sync signal detecting circuit 251 only when detected that the length of time of a square wave of the voltage VP is longer than that of the previous square wave to a predetermined degree, e.g., the length of time of a square wave of the voltage VP is longer than multiple times of the cycle of the previous square wave. Alternatively, the notice signal generating circuit 555 may issue the notice signal Tout to the sync signal detecting circuit 251 only when detected that the length of time of a square wave of the voltage VP exceeds the acceptable limit specified in the design specification of the control circuit 110.

In each of the above embodiments, the control signals of some functional blocks (e.g., the switch 140, the switch 227, and the bias circuit 537) are active high, and the control signals of some functional blocks (e.g., the switch 243) are active low. This is merely an embodiment rather than a restriction to the practical implementations of the control signals of these functional blocks.

In addition, the current mirror structure for realizing the current generating module 113 in the previous embodiments is merely one of the approaches for generating the control current Iosc, and not a restriction to the practical implementations of the current generating module 113. In practice, the function of the current generating module 113 may be realized with other current mirror structure formed by more transistors.

It can be appreciated from the foregoing descriptions that even the switch control circuit 150 does not actively notify the control circuit 110 when switching the external switch 140, the disclosed mode-switching circuit 115 in the control circuit 110 is capable of automatically detecting that whether any external synchronous signal EXT has been coupled to the control pin 111, and then correspondingly switching the operating modes of the oscillating circuit 114. Accordingly, the disclosed control circuit 110 is capable of supporting two different clock frequency setting modes with only a single control pin 111. This structure not only provides the control circuit 110 with more utilization flexibility, but also effectively reduces the required chip packaging area.

In addition, when the oscillating circuit 114 operates in the signal-controlled mode, the clock signal CLK is generated by the combinational logic circuit 247 directly according to the external synchronous signal EXT, and not generated by utilizing a feedback control loop (e.g., a phase-locked loop or a delay-locked loop) to clock the external synchronous signal EXT. Therefore, when the mode-switching circuit 115 switches the oscillating circuit 114 to the signal-controlled mode, the oscillating circuit 114 is enabled to rapidly synchronize the clock signal CLK with the external synchronous signal EXT, thereby achieving better power saving effect. Additionally, the disclosed oscillating circuit 114 requires much less circuit area than the phase-locked loop or the delay-locked loop, and is thus beneficial for reducing the required circuit area of the control circuit 110.

Moreover, the disclosed mode-switching circuit 115 enters the observation period to monitor the variation of the voltage VP only when the voltage VP of the control pin 111 deviates from the predetermined range, and the mode-switching circuit 115 determines that the external synchronous signal EXT is coupled with the control pin 111 only when detected that the voltage VP prevents one or more periodic high-low transitions. Accordingly, it can effectively avoid the mode-switching circuit 115 to erroneously switch the operating modes of the oscillating circuit 114 due to the noise on the control pin 111.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit of a switching regulator, comprising:
a control pin for coupling with an external resistor;
a resistor detecting circuit, coupled with the control pin, configured to operably detect a resistance of the external resistor when the control pin is coupled with the external resistor;
a current generating module, coupled with the resistor detecting circuit, configured to operably generate a corresponding control current according to a detection result of the resistor detecting circuit;
an oscillating circuit, coupled with the control pin and the current generating module, configured to operably generate a clock signal; and
a mode-switching circuit, coupled with the control pin and the oscillating circuit;
wherein when the mode-switching circuit configures the oscillating circuit to operate in a resistor-controlled mode, the oscillating circuit generates the clock signal according to the control current so that the clock signal has a frequency corresponding to the resistance of the external resistor, and when the mode-switching circuit configures the oscillating circuit to operate in a signal-controlled mode, the oscillating circuit generates the clock signal according to an external synchronous signal coupled with the control pin so that the clock signal is synchronized with the external synchronous signal;,
wherein the oscillating circuit comprises:
a first capacitor;
a second switch, coupled between the first capacitor and the current generating module, configured to selectively conduct the control current to the first capacitor under control of the mode-switching circuit;
a second comparison circuit, coupled with the first capacitor and a second reference voltage, configured to operably compare a voltage across the first capacitor with the second reference voltage to generate a comparison signal; and
a combinational logic circuit, coupled with the control pin, the mode-switching circuit, and the second comparison circuit, configured to operably generate the clock signal under control of the mode-switching circuit.

2. The control circuit of claim 1, wherein when the oscillating circuit operates in the resistor-controlled mode, the mode-switching circuit switches the oscillating circuit to the signal-controlled mode after the control pin was coupled with the external synchronous signal for a predetermined period of time.

3. The control circuit of claim 2, wherein when the oscillating circuit operates in the signal-controlled mode, the mode-switching circuit switches the oscillating circuit to the resistor-controlled mode after the control pin ceased to be coupled with the external synchronous signal for a predetermined period of time.

4. The control circuit of claim 3, wherein the resistor detecting circuit comprises:
a first comparison circuit, coupled with the control pin and a first reference voltage, configured to operably compare a voltage of the control pin with the first reference voltage;
a transistor, coupled between the current generating module and the control pin, comprising a control terminal coupled with an output terminal of the first comparison circuit; and
a first switch, coupled between the current generating module and the control pin;

wherein the mode-switching circuit turns on the first switch before the control pin is coupled with the external synchronous signal, and the mode-switching circuit turns off the first switch when the voltage of the control pin changes to exceed a predetermined range.

5. The control circuit of claim 4, wherein the transistor is arranged on a current path between the current generating module and the control pin, and the first switch is arranged on a current path between the transistor and the control pin, or on a current path between the current generating module and the transistor.

6. The control circuit of claim 5, wherein the control current generated by the current generating module is equal to or proportional to a sensing current flowing through the transistor.

7. The control circuit of claim 3, wherein the current generating module comprising:
a current mirror, comprising multiple transistors; and
a bias circuit, coupled with the mode-switching circuit, configured to operably apply a predetermined bias voltage on a control terminal of one of the transistors of the current mirror under control of the mode-switching circuit.

8. The control circuit of claim 7, wherein the mode-switching circuit controls the bias circuit to apply a predetermined bias voltage on a control terminal of one of the transistors of the current mirror when the mode-switching circuit configures the oscillating circuit to operate in the signal-controlled mode.

9. The control circuit of claim 8, wherein the mode-switching circuit controls the bias circuit to apply a predetermined bias voltage on the control terminal of one of the transistors of the current mirror in a predetermined period of time while the mode-switching circuit switches the oscillating circuit from the resistor-controlled mode to the signal-controlled mode.

10. The control circuit of claim 9, wherein the current generating module further comprises:
a second capacitor, coupled with a control terminal of one of the transistors of the current mirror.

11. The control circuit of claim 3, wherein the mode-switching circuit comprises:
a sync signal detecting circuit, coupled with the control pin, the resistor detecting circuit, and the oscillating circuit, configured to operably detect a voltage of the control pin and control operations of the resistor detecting circuit and the oscillating circuit.

12. The control circuit of claim 11, wherein the sync signal detecting circuit switches the oscillating circuit to the signal-controlled mode when detecting that the voltage of the control pin has one or more periodic high-low transitions.

13. The control circuit of claim 11, wherein the mode-switching circuit further comprises:
an in-phase signal generating circuit, coupled with the sync signal detecting circuit and the oscillating circuit, configured to operably generate an in-phase signal having a same phase with the clock signal according to the clock signal;
wherein the sync signal detecting circuit switches the oscillating circuit to the signal-controlled mode when detecting that the voltage of the control pin has one or more periodic high-low transitions, and a phase of square waves of the voltage of the control pin and a phase of the in-phase signal are the same or have a difference smaller than a threshold.

14. The control circuit of claim 13, wherein the mode-switching circuit further comprises:

a notice signal generating circuit, coupled with the control pin and the sync signal detecting circuit, configured to operably detect a square wave cycle of the voltage of the control pin and to operably generate a corresponding notice signal to the sync signal detecting circuit when the square wave cycle of the voltage of the control pin exceeds a predetermined length of time;

wherein when received the notice signal, the sync signal detecting circuit switches the oscillating circuit to the resistor-controlled mode.

15. The control circuit of claim 11, wherein the mode-switching circuit further comprises:

a notice signal generating circuit, coupled with the control pin and the sync signal detecting circuit, configured to operably detect a square wave cycle of the voltage of the control pin and to operably generate a corresponding notice signal to the sync signal detecting circuit when the square wave cycle of the voltage of the control pin exceeds a predetermined length of time;

wherein when received the notice signal, the sync signal detecting circuit switches the oscillating circuit to the resistor-controlled mode.

16. The control circuit of claim 1, wherein when the mode-switching circuit configures the oscillating circuit to operate in the resistor-controlled mode, the mode-switching circuit turns on the second switch and configures the combinational logic circuit to generate the clock signal according to the comparison signal.

17. The control circuit of claim 1, wherein when the mode-switching circuit configures the oscillating circuit to operate in the signal-controlled mode, the mode-switching circuit turns off the second switch and configures the combinational logic circuit to generate the clock signal according to the external synchronous signal.

18. A control circuit of a switching regulator, comprising:
a control pin for coupling with an external resistor;
a resistor detecting circuit, coupled with the control pin, configured to operably detect a resistance of the external resistor when the control pin is coupled with the external resistor;
a current generating module, coupled with the resistor detecting circuit, configured to operably generate a corresponding control current according to a detection result of the resistor detecting circuit;
an oscillating circuit, coupled with the control pin and the current generating module, configured to operably generate a clock signal; and
a mode-switching circuit, coupled with the control pin and the oscillating circuit;
wherein when the mode-switching circuit configures the oscillating circuit to operate in a resistor-controlled mode, the oscillating circuit generates the clock signal according to the control current so that the clock signal has a frequency corresponding to the resistance of the external resistor, and when the mode-switching circuit configures the oscillating circuit to operate in a signal-controlled mode, the oscillating circuit generates the clock signal according to an external synchronous signal coupled with the control pin so that the clock signal is synchronized with the external synchronous signal;

wherein the resistor detecting circuit comprises:
a first comparison circuit, coupled with the control pin and a first reference voltage, configured to operably compare a voltage of the control pin with the first reference voltage;
a transistor, coupled between the current generating module and the control pin, comprising a control terminal coupled with an output terminal of the first comparison circuit; and
a first switch, coupled between the current generating module and the control pin;
wherein the mode-switching circuit turns on the first switch before the control pin is coupled with the external synchronous signal, and the mode-switching circuit turns off the first switch when the voltage of the control pin changes to exceed a predetermined range.

19. A control circuit of a switching regulator, comprising:
a control pin for coupling with an external resistor;
a resistor detecting circuit, coupled with the control pin, configured to operably detect a resistance of the external resistor when the control pin is coupled with the external resistor;
a current generating module, coupled with the resistor detecting circuit, configured to operably generate a corresponding control current according to a detection result of the resistor detecting circuit;
an oscillating circuit, coupled with the control pin and the current generating module, configured to operably generate a clock signal; and
a mode-switching circuit, coupled with the control pin and the oscillating circuit;
wherein when the mode-switching circuit configures the oscillating circuit to operate in a resistor-controlled mode, the oscillating circuit generates the clock signal according to the control current so that the clock signal has a frequency corresponding to the resistance of the external resistor, and when the mode-switching circuit configures the oscillating circuit to operate in a signal-controlled mode, the oscillating circuit generates the clock signal according to an external synchronous signal coupled with the control pin so that the clock signal is synchronized with the external synchronous signal;
wherein the mode-switching circuit comprises:
a sync signal detecting circuit, coupled with the control pin, the resistor detecting circuit, and the oscillating circuit, configured to operably detect a voltage of the control pin and control operations of the resistor detecting circuit and the oscillating circuit; and
an in-phase signal generating circuit, coupled with the sync signal detecting circuit and the oscillating circuit, configured to operably generate an in-phase signal having a same phase with the clock signal according to the clock signal;
wherein the sync signal detecting circuit switches the oscillating circuit to the signal-controlled mode when detecting that the voltage of the control pin has one or more periodic high-low transitions, and a phase of square waves of the voltage of the control pin and a phase of the in-phase signal are the same or have a difference smaller than a threshold.

* * * * *